Figure 2:
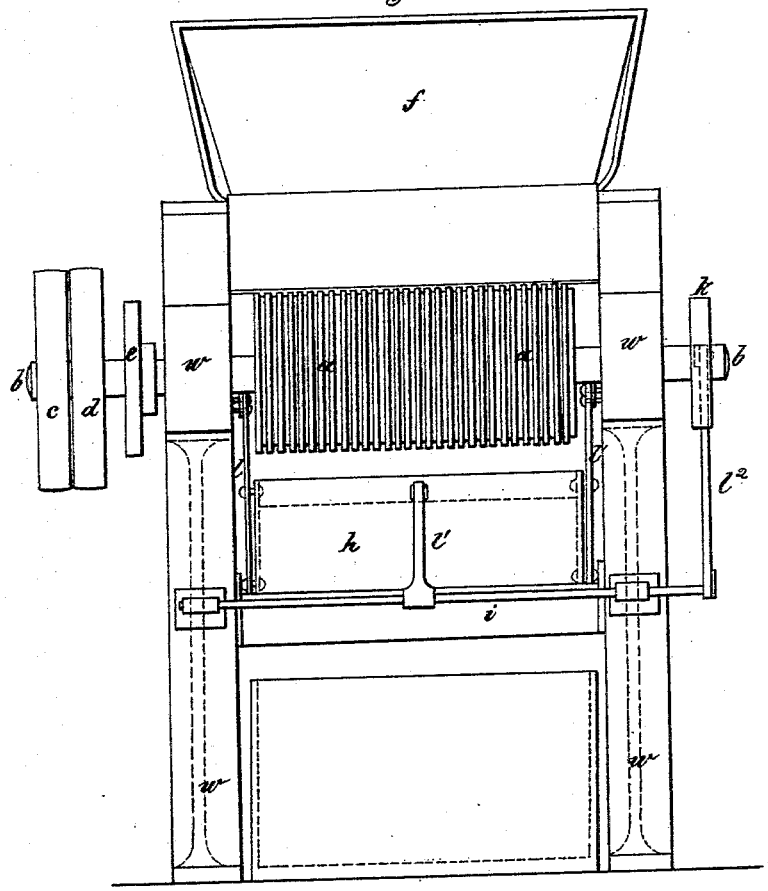

4 Sheets—Sheet 1.
E. DURAND.
Tobacco-Cutting Machine.
No. 210,927. Patented Dec. 17, 1878.
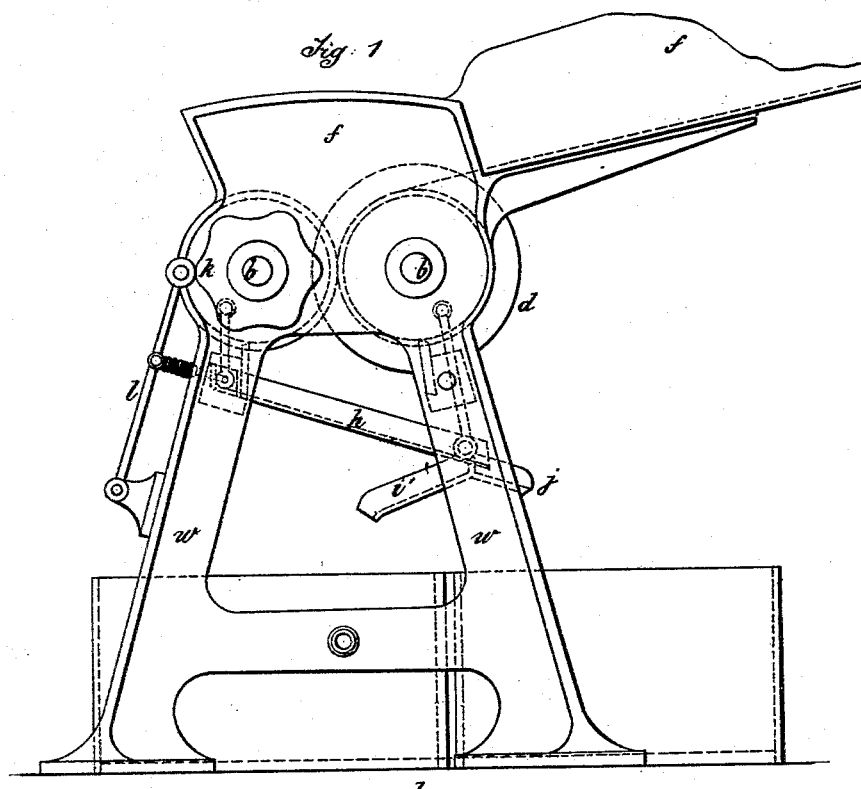
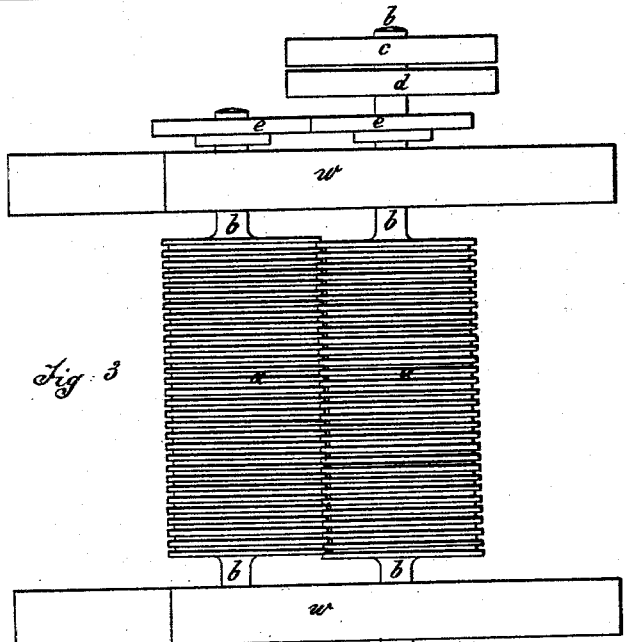
Witnesses:
Inventor
Eugene Durand E. DURAND.
Tobacco-Cutting Machine.

No. 210,927. Patented Dec. 17, 1878.

4 Sheets—Sheet 2.

Witnesses:

Inventor
Eugene Durand

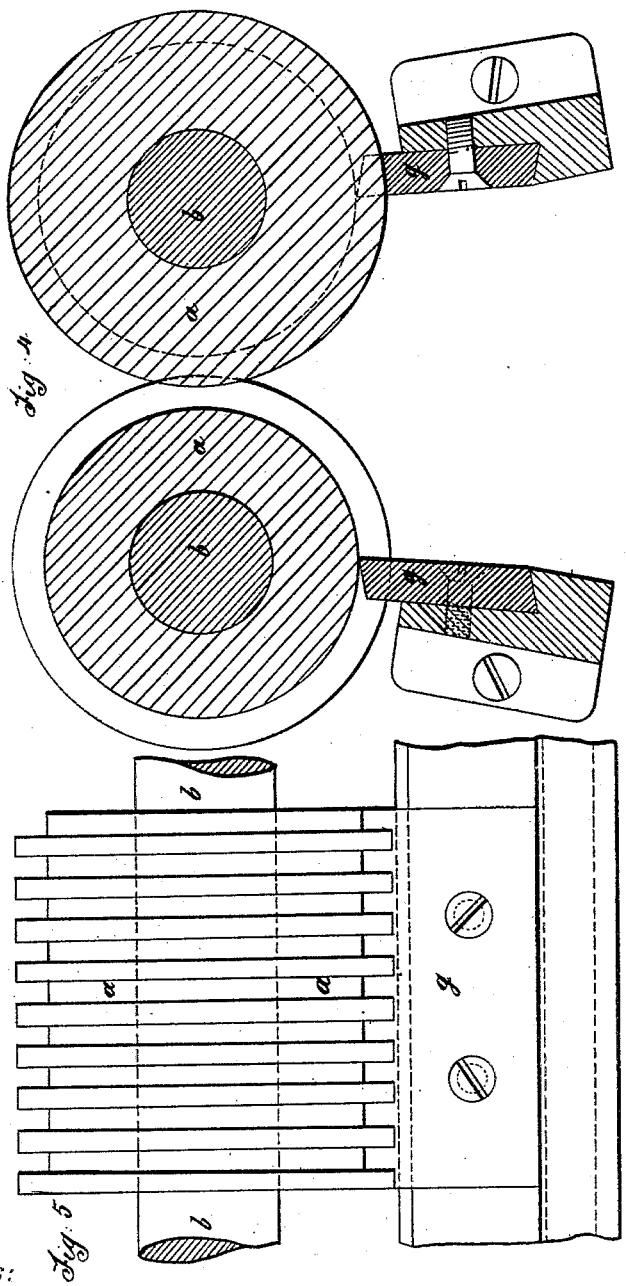

E. DURAND.
Tobacco-Cutting Machine.

No. 210,927. Patented Dec. 17, 1878.

Witnesses:

Inventor:
Eugene Durand

UNITED STATES PATENT OFFICE.

EUGÈNE DURAND, OF PARIS, FRANCE.

IMPROVEMENT IN TOBACCO-CUTTING MACHINES.

Specification forming part of Letters Patent No. 210,927, dated December 17, 1878; application filed July 11, 1878.

*To all whom it may concern:*

Be it known that I, EUGÈNE DURAND, of Paris, France, have invented Improvements in Machinery and Apparatus for Cutting, Chopping, or Breaking Tobacco, Paper, and other like materials; and I do hereby declare that the following is a full, clear, and exact description of the same, reference being had to the annexed sheets of drawing, making a part of the specification.

This invention relates to a machine for cutting or chopping tobacco-leaf to make what is known as "picadura," such as is used in Spain, Havana, and in South America; also, for cutting or chopping up herbs or medicinal plants designed to be used in the manufacture of chemical cigarettes or to be prepared for distilling purposes.

The said machine is also applicable for cutting up roots, sea-weed, rags, and other like materials. It is also applicable for cutting paper into bands of any length and width for making endless rolls, or in certain cases curled paper, colored or white, to be used for wrapping up fancy or artistic objects; or commoner paper, such as newspapers, may be operated upon and curled to make it applicable for wrapping up objects of less value than such as these above mentioned.

I employ in the said machine two grooved or channeled cylinders geared lightly together, and which, on being rotated, act like roller-shears. These cylinders may be each constructed of one single piece or of separate parts, and I may construct them of disks placed in juxtaposition, which disks may be tempered or untempered. The disks may be in two parts, like two springs known as "Belleville springs," so as to allow of providing for the effects of wear.

I combine with the said cylinders suitable devices or apparatus for feeding the machine with the material to be cut, for separating the same after it has been cut, and for collecting together the product obtained. For example, when picadura is to be manufactured, the leaves of tobacco may be directly subjected to the action of the said cylinders, or they may be first cut into threads or pieces of greater or less dimensions by means of a chopping or ordinary knife, which may be a part of the machine or separate therefrom.

The said cylinders may be provided with scrapers or combs to clean them and to detach from their channels or grooves the cut tobacco or other material.

In operating upon paper for wrapping purposes the scrapers or combs cause the paper to be more or less curled, according to whether they are more or less inclined.

The cut paper may be allowed to escape directly from the cylinders, or it may be caused to pass into a pipe covered with a bag or sack forming a sheath, in such a manner as to receive the paper within it.

Figure 6:
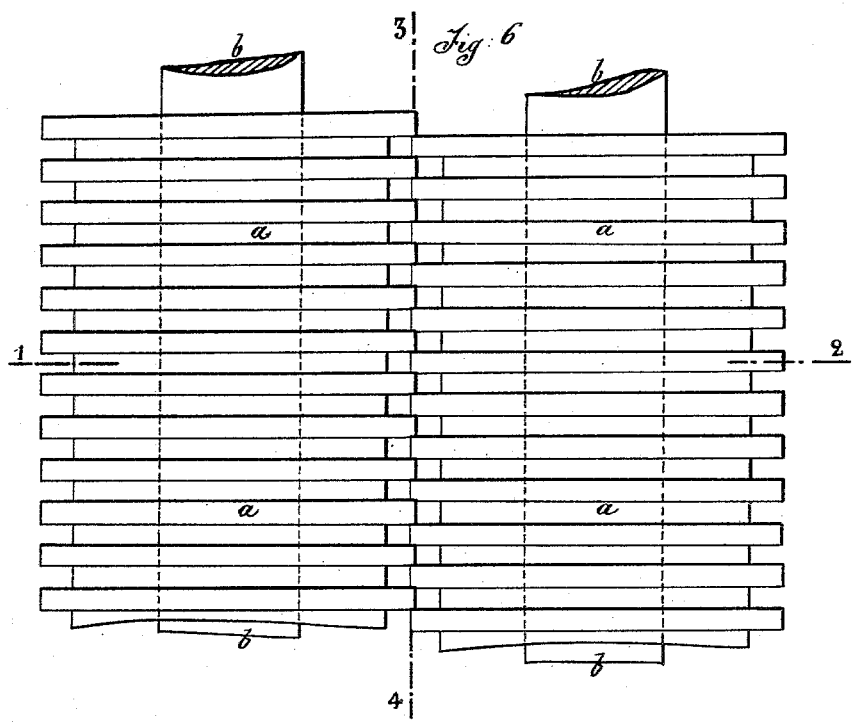

In the drawing, Figures 1, 2, and 3 represent a side elevation, an end view, and a plan of a machine constructed according to my said invention, and designed for cutting or chopping up tobacco and for cutting paper into narrow curled bands to serve for wrapping purposes. Figs. 4, 5, and 6 represent, on an enlarged scale, a transverse section on the line 1 2, a longitudinal view on the line 3 4, and a plan of the pair of grooved or channeled cutting-cylinders and of the scrapers or combs which serve to detach the chopped tobacco from their grooves or channels or to effect the curling of the narrow bands of paper.

Similar letters of reference refer to the same parts throughout these figures.

$a\ a$ represent the cylinders grooved or channeled, so as to form right-angular flanges, and geared lightly together, as shown in Figs. 4 and 6, so that the flanges of one cylinder will mesh with the grooves of the other. By this construction each flange will be provided with two cutting-edges. They are keyed upon the shafts $b\ b$, which turn in bearings forming part of the frame $w$ of the machine.

$c\ d$ are fast and loose pulleys, mounted on the shaft of one of the two cylinders to transmit a rotary movement by means of a strap from any suitable motor. The two cylinders control each other, and revolve in contrary directions or at varying speeds by means of the toothed wheels $e\ e$, keyed on the shafts $b\ b$.

$f$ is a hopper, in which the tobacco in the leaf or in threads or pieces is placed.

Instead of the hopper I may employ other means for feeding the machine—such, for instance, as an endless apron or chain devices, or other similar apparatus. In employing an endless apron the line passing over the axes of the cylinders may be vertical instead of horizontal—that is to say, the cylinders may be superposed, as in the case of a rolling-mill.

$g$ $g$ are the scrapers or combs, provided to clean the cylinders and to detach from their grooves or channels the chopped tobacco; also, to curl the paper.

$k$ is a cam keyed on one of the shafts of the cylinders. $h$ is a sieve having a closed bottom, and suspended from the frame under the cylinders by the rods $l$ $l$. $i$ is a rock-shaft having bearings on each side of the frame. $l^1$ is an arm, firmly attached to the rock-shaft $i$, and having its upper end pivoted or hinged to the sieve $h$. $l^2$ is a crank-arm on the outer end of the rock-shaft $i$, the said arm being provided with a friction-wheel at its free end, which works in the groove of the cam. $i'$ $j$ are inclined planes or chutes for conveying the tobacco to their respective receptacles.

It will thus be seen that when the machine is put in motion the sieve will receive a vibratory motion, and the tobacco from the cutters falling on the sieve will be separated thereby, the finer portions passing through the sieve, thence down the closed bottom to the inclined plane or chute $i'$, where they are delivered into a suitable receptacle, while the coarser portions, which are to be again subjected to the action of the cylinders, will pass over the sieve to the inclined plane or chute $j$, which delivers them into a separate receptacle.

I am aware that two grooved or channeled disks geared together have been used for cutting tobacco, leather, and other materials; but—

What I claim, and desire to secure by Letters Patent, is—

In a tobacco-cutting machine, the combination of the grooved cylinders $a$ $a$, the sieve $h$, the chutes $i'$ $j$, the rods or straps $l$ $l$, the rock-shaft $i$, the arm $l^1$, the crank-arm $l^2$, and the cam $k$, substantially as and for the purpose described.

E. DURAND.

Witnesses:
 ROBT. M. HOOPER,
 EUGÈNE HÈBERT.